(12) United States Patent
Liu

(10) Patent No.: US 10,689,862 B2
(45) Date of Patent: Jun. 23, 2020

(54) METHOD AND APPARATUS FOR COATING SOLID WOOD FLOOR AND SOLID WOOD FLOOR

(71) Applicant: Zhejiang Lingge Wood Co., Ltd., Zhejiang (CN)

(72) Inventor: Binbin Liu, Zhejiang (CN)

(73) Assignee: ZHEJIANG LINGGE WOOD CO., LTD., Zhejiang (CN)

( * ) Notice: Subject to any disclaimer, the term of this patent is extended or adjusted under 35 U.S.C. 154(b) by 0 days.

(21) Appl. No.: 15/976,281

(22) Filed: May 10, 2018

(65) Prior Publication Data

US 2019/0106888 A1   Apr. 11, 2019

(30) Foreign Application Priority Data

Oct. 9, 2017 (CN) .......................... 2017 1 0929410

(51) Int. Cl.
*B32B 37/00* (2006.01)
*E04F 15/04* (2006.01)
(Continued)

(52) U.S. Cl.
CPC ............. *E04F 15/04* (2013.01); *B05D 7/06* (2013.01); *B29C 63/003* (2013.01); *B29C 63/0017* (2013.01); *B29C 63/0047* (2013.01); *B29C 63/0065* (2013.01); *B32B 3/06* (2013.01); *B32B 21/08* (2013.01); *B32B 37/0053* (2013.01);
(Continued)

(58) Field of Classification Search
USPC .................................. 225/96.5, 100; 53/228
See application file for complete search history.

(56) References Cited

U.S. PATENT DOCUMENTS 3,508,693 A * 4/1970 Rossi ....................... B26D 1/00
225/100
3,635,193 A * 1/1972 Stease .................... D21H 23/68
118/63
(Continued)

FOREIGN PATENT DOCUMENTS

EP        2522476 A2    11/2012
WO   2005045155 A1     5/2005

OTHER PUBLICATIONS

Extended European Search Report dated Nov. 11, 2018 for European application No. 18177935.6.

*Primary Examiner* — Charles Capozzi
(74) *Attorney, Agent, or Firm* — Ohlandt, Greeley, Ruggiero & Perle, LLP

(57) ABSTRACT

A method and an apparatus for coating a solid wood floor and a solid wood floor are provided. The method for coating a solid wood floor includes providing a solid wood floor, where the solid wood floor has two side surfaces defining boundaries of a width dimension of the solid wood floor; and providing a polyethylene protective film, and adhering the polyethylene protective film to at least one of the two side surfaces. Therefore, external moisture can be prevented from entering the solid wood floor so as to avoid deformation of the floor due to moisture; an external dust, water, etc. can be prevented from entering between two adjacent solid wood floors; an overall appearance of the laid solid wood floors will not be affected by the coating; when the laid solid wood floors are subjected to force, no noise will be emitted, thereby improving customer satisfaction.

17 Claims, 5 Drawing Sheets

(51) Int. Cl.
  *B32B 21/08* (2006.01)
  *B32B 3/06* (2006.01)
  *B05D 7/06* (2006.01)
  *E04F 15/02* (2006.01)
  *B29C 63/00* (2006.01)
  *B29L 31/00* (2006.01)
  *B29C 63/48* (2006.01)

(52) U.S. Cl.
  CPC .. *E04F 15/02038* (2013.01); *B29C 2063/483* (2013.01); *B29K 2023/06* (2013.01); *B29L 2031/003* (2013.01); *B29L 2031/732* (2013.01); *B32B 2255/08* (2013.01); *B32B 2323/04* (2013.01); *B32B 2419/04* (2013.01); *E04F 15/02011* (2013.01)

(56) References Cited

U.S. PATENT DOCUMENTS

| | | | | |
|---|---|---|---|---|
| 4,258,651 A | * | 3/1981 | Knudtson | B27N 7/00 |
| | | | | 118/114 |
| 4,967,689 A | * | 11/1990 | Wittmann | B05C 3/18 |
| | | | | 118/413 |
| 6,389,782 B1 | * | 5/2002 | Kinugawa | B41M 3/12 |
| | | | | 53/209 |
| 2013/0008118 A1 | | 1/2013 | Baert et al. | |

* cited by examiner

METHOD AND APPARATUS FOR COATING SOLID WOOD FLOOR AND SOLID WOOD FLOOR

CROSS-REFERENCE TO RELATED APPLICATIONS

This application claims the benefit of priority to Chinese Patent Application No. 201710929410.8, titled "METHOD AND APPARATUS FOR COATING SOLID WOOD FLOOR AND SOLID WOOD FLOOR", filed on Oct. 9, 2017, the entire disclosure of which are incorporated herein by reference.

TECHNICAL FIELD

The present disclosure relates to home decoration field, and more particularly, to a method and an apparatus for coating a solid wood floor, and a solid wood floor.

BACKGROUND

Solid wood floor is a ground decoration material formed by drying and processing natural wood. The solid wood floor is natural in texture and is safe to use because it is made by directly processing solid wood. The solid wood floor has become an ideal material of ground decoration in bedrooms, living rooms and study rooms etc. However, after being laid on a ground, the solid wood floor usually has a short service life, which reduces customer experience and causes customer complaints. Therefore, how to improve the service life of solid wood floor becomes a technical problem that urgently needs to be solved in the prior art.

SUMMARY

In order to solve the problem in the prior art that the solid wood floor having a short service life, which reduces the customer experience and causes customer complaints, a method for coating a solid wood floor is provided according to embodiments of the present disclosure, including: providing a solid wood floor, where the solid wood floor has two side surfaces defining boundaries of a width dimension of the solid wood floor; and providing a polyethylene protective film, and adhering the polyethylene protective film to at least one of the two side surfaces.

In some embodiment, the polyethylene protective film is gradually adhered to the at least one side surface from one end to the other end of the at least one side surface along a length direction of the solid wood floor.

In some embodiment, the polyethylene protective film is adhered to the at least one side surface at a speed ranging from 0.5 m/s to 0.7 m/s.

In some embodiment, the method for coating a solid wood floor may further include heating both ends of the at least one side surface after adhering the polyethylene protective film to the at least one side surface, where the heating temperature ranges from 400° C. to 600° C.

In some embodiment, the method for coating a solid wood floor may further include forming a paint film on the at least one side surface before adhering the polyethylene protective film to the at least one side surface.

In some embodiment, the polyethylene protective film has a thickness ranging from 0.05 mm to 0.20 mm.

In some embodiment, the two side surfaces include a first side surface having a tongue structure and a second side surface having a groove structure, and the polyethylene protective film is adhered to the first side surface.

In order to solve the above technical problems, an apparatus for coating a solid wood floor is also provided according to embodiments of the present disclosure, including: two side surfaces defining boundaries of a width dimension of the solid wood floor, where a polyethylene protective film is formed on at least one of the two side surfaces.

In some embodiment, the polyethylene protective film has a thickness ranging from 0.05 mm to 0.20 mm.

In some embodiment, the apparatus for coating a solid wood floor further include a paint film formed on the at least one side surface, where the polyethylene protective film covers the paint film.

In some embodiment, the two side surfaces include a first side surface having a tongue structure and a second side surface having a groove structure, and the polyethylene protective film is formed on the first side surface.

An apparatus for coating a solid wood floor is also provided according to embodiments of the present disclosure, including: a conveying device, including at least one slide rail and a conveying member disposed on the at least one slide rail, where the conveying member is configured to carry a solid wood floor and to convey the solid wood floor along an extending direction of the at least one slide rail; and a film coating device, including a film rolling part and at least one pressing wheel, where the film rolling part is fixedly disposed on the conveying device and is configured to receive a polyethylene protective film; the at least one pressing wheel is rotatably disposed on the at least one slide rail and is disposed opposite to at least one side surface of the solid wood floor and is configured to press the polyethylene protective film toward the side surface, where the at least one side surface of the solid wood floor defines at least one boundary of a width dimension of the solid wood floor.

In some embodiment, the conveying member includes a plurality of first rollers disposed in sequence along the extending direction of the at least one slide rail, and the plurality of first rollers are configured to convey the solid wood floor by rotating.

In some embodiment, the conveying device further includes at least one second roller rotatably disposed on the at least one slide rail, the at least one second roller is disposed opposite to the conveying member along a direction perpendicular to the at least one slide rail and is configured to press against the solid wood floor.

In some embodiment, the at least one slide rail includes a first slide rail and a second slide rail arranged in parallel; the at least one pressing wheel includes at least one first pressing wheel rotatably disposed on the first slide rail, and at least one second pressing wheel rotatably disposed on the second slide rail; and the at least one first pressing wheel and the at least one second pressing wheel are disposed opposite to two side surfaces of the solid wood floor respectively.

In some embodiment, a plurality of the first pressing wheels are disposed in sequence along an extending direction of the first slide rail, and a plurality of the second pressing wheels are disposed in sequence along an extending direction of the second slide rail.

In some embodiment, a distance between the first slide rail and the second slide rail is adjustable.

In some embodiment, the apparatus for coating a solid wood floor further includes a tearing device connected with the conveying device and configured to receive the solid wood floor after being coated; where the tearing device includes at least one fixed guide roller, the at least one guide roller is configured to fit the solid wood floor and to drive the solid wood floor to move along the extending direction of the at least one slide rail by rotation.

In some embodiment, the at least one guide roller includes a first guide roller and a second guide roller, the first guide roller is configured to fit a front of the solid wood floor, and the second guide roller is configured to fit a back of the solid wood floor.

In some embodiment, the tearing device further includes a driving motor, and the driving motor is connected with the at least one guide roller to drive the at least one guide roller to rotate.

Compared with the prior art, the present disclosure has the following advantages.

In the method for coating a solid wood floor, external moisture can be prevented from entering an interior of the solid wood floor by adhering the polyethylene film to at least one side surface of the solid wood floor, where that at least one side surface defines the at least one boundary of the width dimension of the solid wood floor. Therefore, the floor can be prevented from being deformed by moisture, a service life of the solid wood floor can be enhanced and customer satisfaction can be improved; an external dust, water, etc. can be prevented from entering between two solid wood floors paved adjacently; an overall appearance of the laid solid wood floor will not be affected after the coating; when the laid solid wood floors are subjected to force, two adjacent solid wood floors will not emit noise due to sliding, thereby enabling the laid solid wood floor with functions of mute and noise elimination and further enhancing customer satisfaction.

DETAILED DESCRIPTION

In order to make the above-mentioned objects, features and advantages of the present disclosure more easily understood, specific embodiments of the present disclosure will be described in detail with reference to the accompanying drawings below. Apparently, embodiments described below are merely a portion of embodiments of the present disclosure, and are not all embodiments. All other embodiments obtained by those of ordinary skill in the art without making creative work are within the scope of the present disclosure, based on embodiments disclosed hereinafter.

Figure 1:
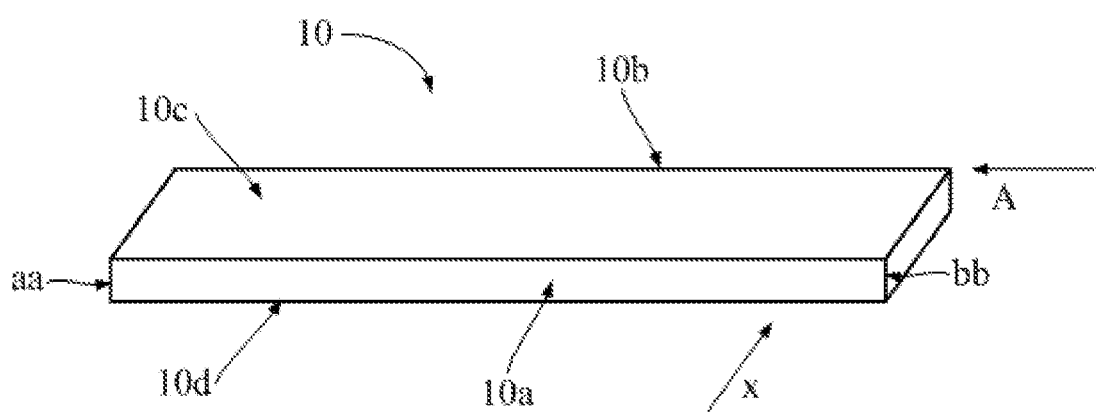
FIG. 1 schematically illustrates a stereogram of a solid wood floor 10 according to an embodiment of the present disclosure.
Figure 2:
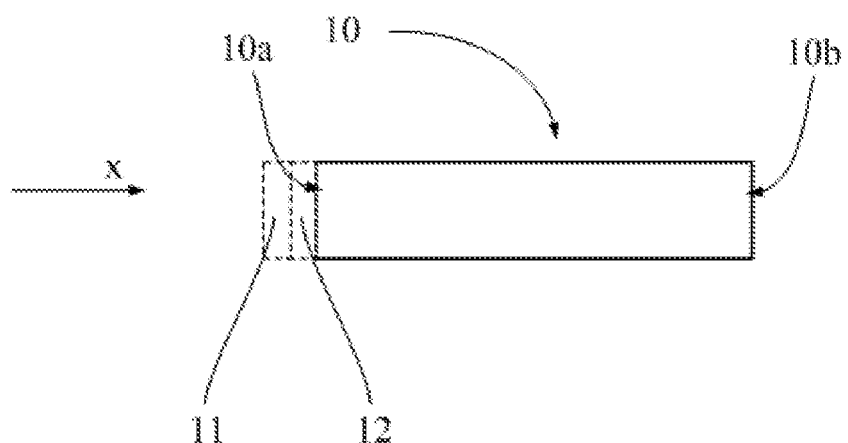
FIG. 2 schematically illustrates a structural diagram of the solid wood floor 10 along a direction A shown in FIG. 1.

Referring to FIG. 1 and FIG. 2, FIG. 1 schematically illustrates a stereogram of a solid wood floor 10 according to an embodiment of the present disclosure, and FIG. 2 schematically illustrates a structural diagram of the solid wood floor 10 along a direction A shown in FIG. 1. In some embodiment, a solid wood floor 10 has an elongated shape with a front surface 10c, a back surface 10d, a first side surface 10a and a second side surface 10b, where the first side surface 10a and the second side surface 10b define boundaries of a width dimension of the solid wood floor 10. Specifically, each of the first side surface 10a and the second side surface 10b may be perpendicular to a width direction x as shown in FIGS. 1 and 2. When the solid wood floor 10 is laid on a ground, the front surface 10c is exposed outside, the back surface 10d faces the ground, and the first side surface 10a and the second side surface 10b of two adjacent solid wood floors 10 fit together to ensure flatness of the floor.

After the solid wood floor 10 is laid on the ground, the first side surface 10a and the second side surface 10b of the solid wood floor 10 will not be exposed outside and thus will not affect an overall appearance of the solid wood floor 10. Therefore, in the prior art, the first side surface 10a and the second side surface 10b are usually not processed by solid wood floor manufacturers in order to improve production efficiency and to reduce production cost.

The inventors found that, if being directly laid on a ground without processing the first side surface 10a and the second side surface 10b, the solid wood floor 10 tends to have a short service life. Generally, the solid wood floor will be deformed by moisture after a few years, resulting in change in an overall structure of the solid wood floor, affecting a service life of the solid wood floor, reducing the customer experience and causing customer complaints.

Further investigation shows that solid wood floor is made of a natural wood, and the natural wood has pores allowing sap to flow. When the natural wood is processed into a solid wood floor, pores in the solid wood floor still exist and allow external moisture to enter the solid wood floor through the pores, which causes the solid wood floor to be easily damped and deformed, and further affects an overall structure of the laid solid wood floor.

In addition, if the first side surface 10a and the second side surface 10b of two adjacent solid wood floors are directly contacted and jointed, a gap will generate between the first side surface 10a and the second side surface 10b due to manufacturing tolerance or the like, which may easily cause dust, water, etc. to enter the gap and to affect the overall appearance of the laid solid wood floor.

Further, since the first side surface 10a and the second side surface 10b are in contact with each other, when the solid wood floor is subjected to a force, for example, when a human walks on the laid solid wood floor, a relative sliding may occur to the first side surface 10a and the second side surface 10b and noise may be emitted, thereby reducing customer experience and causing customer complaints.

Therefore, a method for coating a solid wood floor is provided according to embodiments of the present disclosure.

The method may include providing a solid wood floor 10 with a first side surface 10a and a second side surface 10b, where the first side surface 10a and the second side surface 10b define boundaries of a width dimension of the solid wood floor 10; providing a polyethylene protective film 11 (PE protective film), and adhering the polyethylene protective film 11 to at least one of the first side surface 10a and the second side surface 10b. The polyethylene protective film 11 can prevent external moisture from entering an interior of the solid wood floor 10, thereby preventing the solid wood floor 10 from being deformed by moisture, extending a service life of the solid wood floor 10 and improving customer satisfaction.

In addition, since the polyethylene protective film 11 is adhered to at least one of the first side surface 10a and the second side surface 10b, the polyethylene protective film 11 can fill a gap between two adjacent solid wood floors when the solid wood floor 10 is laid on a ground. Therefore, external dust, water, etc. can be prevented from entering between two adjacent solid wood floors, and an overall appearance of the laid solid wood floors will not be affected by the coating.

Moreover, the polyethylene protective film 11 also has functions of lubrication and mute. When the laid solid wood floors are subjected to a force, even if a relative slide exists between the first side surface 10a and the second side surface 10b of two adjacent solid wood floors, no noise will be emitted. Therefore, the laid solid wood floors possess functions of mute and noise elimination, which can enhance customer experience.

In some embodiment, the polyethylene protective film 11 may have a thickness ranging from 0.05 mm to 0.20 mm. If the thickness of the polyethylene protective film 11 is too thick, an overall appearance of the solid wood floor 10 will be affected, and production cost will be increased; if the thickness of the polyethylene protective film 11 is too thin, the polyethylene protective film 11 will be easily broken, resulting in failure in sealing pores, and it may also cause gaps between adjacent solid wood floors when the solid wood floors 10 are laid on the ground and thus affects their appearance.

Figure 3:
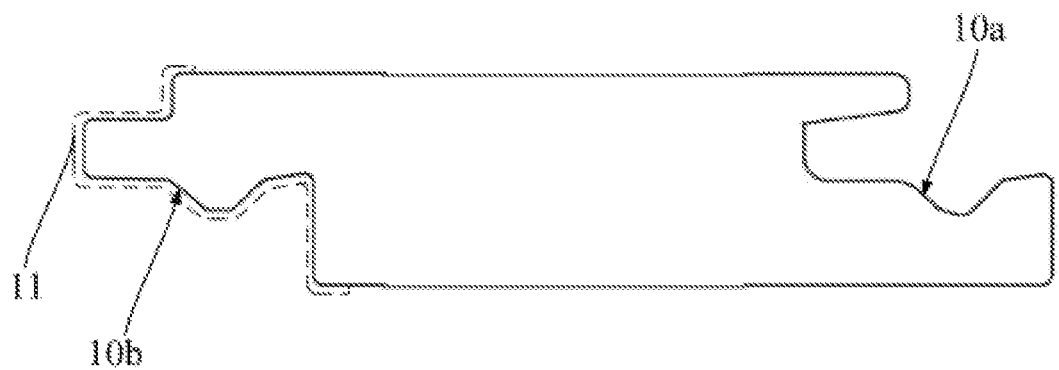
FIG. 3 and FIG. 4 schematically illustrate side views of two different locking mechanisms of the solid wood floor 10 shown in FIG. 1.

Referring to FIG. 3, in some embodiment, the first side surface 10a of the solid wood floor 10 may have a tongue structure, and the second side surface 10b may have a groove structure. In some embodiment, the polyethylene protective film 11 may be adhered to the first side surface 10a, but not to the second side surface 10b. Since the first side surface 10a with the tongue structure protrudes outward, it is much easier for the polyethylene protective film 11 to be adhered to the first side surface 10a. However, the second side surface face 10b with the groove structure is recessed inward, thus it is difficult to put the polyethylene protective film 11 into the recessed area and adhere it to the second side surface 10b.

It should be noted that, the above embodiments impose no limitation to the method for coating a solid wood floor in the present disclosure. In other embodiments, the polyethylene protective film 11 may be adhered only to the second side surface face 10b, or may be adhered to both the first side surface 10a and the second side surface face 10b.

Figure 4:
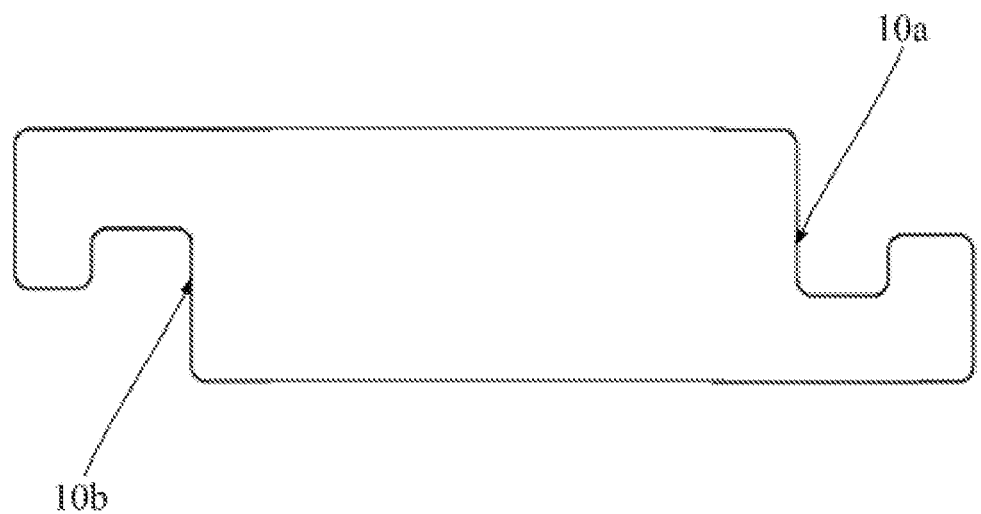

In addition, the first side surface 10a and the second side surface 10b of the solid wood floor 10 may have various shapes and structures. For example, the first side surface 10a and the second side surface 10b may both have a planar structure, or may respectively have a structure of tongue and a structure of groove or vice versa (shown in FIG. 3), or may respectively have a structure of male buckle and a structure of female buckle (shown in FIG. 4), each of which can achieve adhering the polyethylene protective film 11 to the first side surface 10a or the second side surface 10b.

In order to better seal the pores of the solid wood floor and to better play a damp-proof and mute effect. The method for coating the first side surface 10a according to some embodiment of the present disclosure is described as follows.

As shown in FIG. 2, a first paint film 12 may be formed on the first side surface 10a before the first side surface 10a is coated. Specifically, the first paint film 12 may be sprayed on the first side surface 10a. The first paint film 12 can seal the pores on the first side surface 10a to a certain extent, thereby preventing external moisture from entering an interior of the floor from the first side surface 10a and preventing the solid wood floor 10 from getting damp.

In addition, after the first paint film 12 is sprayed on the first side surface 10a, the first side surface 10a will become smoother. Therefore, it will be much easier for the polyethylene protective film 11 to be adhered to the first side surface 10a.

As shown in FIG. 1, the first side surface 10a has a first end aa and a second end bb in a length direction of the solid wood floor 10. When the first side surface 10a is being coated, the polyethylene protective film 11 may be gradually adhered from one of the first end aa and the second end bb to the other. Specifically, the polyethylene protective film 11 may be adhered at a speed ranging from 0.5 m/s to 0.7 m/s.

In some embodiment, the solid wood floor 10 may be in an elongated shape, so that it is relatively more convenient to adhere the polyethylene protective film 11 from one end to the other end along a length direction, and it is more beneficial to ensure that no bubble will be formed between the polyethylene protective film 11 and the first side surface 10a.

Specifically, during a film coating process, the polyethylene protective film 11 may be first adhered to the first end aa or the second end bb, and then the solid wood floor 10 is moved along its length direction. During the movement of the solid wood floor 10, the polyethylene protective film 11 is gradually adhered to the second end bb or the first end aa.

In some embodiment, the solid wood floor 10 may be moved at a speed ranging from 0.5 m/s to 0.7 m/s. If the solid wood floor 10 is moved too slow, the coating efficiency and production benefit will decrease; if the solid wood floor 10 is moved too fast, the polyethylene protective film 11 will be tore off.

In order that the polyethylene protective film 11 can completely cover the first side surface 10a, the polyethylene protective film 11 may generally have a length larger than the first side surface 10a. When the polyethylene protective film 11 is adhered to the first side surface 10a, an extra polyethylene protective film 11 may protrude out of the first end aa or the second end bb, which affects an overall appearance of the solid wood floor 10.

Therefore, after the polyethylene protective film 11 is adhered to the first side surface 10a, the method may further include heating the first end aa or the second end bb to melt the polyethylene protective film 11 to make sure the polyethylene protective film 11 lies between the first end aa and the second end bb and to enhance the overall appearance of the solid wood floor 10.

Specifically, the first end aa or the second end bb may be blown with a hot air gun, and a hot air temperature of the hot air gun may range from 400° C. to 600° C. If the heating temperature is too low, the polyethylene protective film 11 may be not easily to be melted, reducing production efficiency; if the heating temperature is too high, an end of the solid wood floor 10 may be damaged, resulting in product defect.

In some embodiment, the second side surface 10b may be also coated, and the specific coating method of the second side surface 10b may refer to that of the first side surface 10a, which will not be described in detail herein.

In other variations, based on an actual requirement, two side surfaces of the solid wood floor 10 defining boundaries of a length dimension of the solid wood floor 10 may be coated, and the specific coating method may refer to that of the first side surface 10a, which will not be described in detail herein.

With continued reference to FIGS. 1 and 2, a solid wood floor 10 is also provided according to embodiments. The solid wood floor 10 may include a front surface 10c exposed outside when the solid wood floor 10 is laid on a ground, a back surface 10d opposite to the front surface 10c, a first side surface 10a and a second side surface 10b, where the first side surface 10a and the second side surface 10b define boundaries of a width dimension of the solid wood floor 10. Specifically, each of the first side surface 10a and the second side surface 10b may be perpendicular to a width direction x as shown in FIGS. 1 and 2.

In some embodiment, a first paint film 12 and a polyethylene protective film 11 may be formed on the first side surface 10a, and the polyethylene protective film 11 may cover the first paint film 12. Specifically, the polyethylene protective film 11 may have a thickness ranging from 0.05 mm to 0.20 mm.

Figure 5:
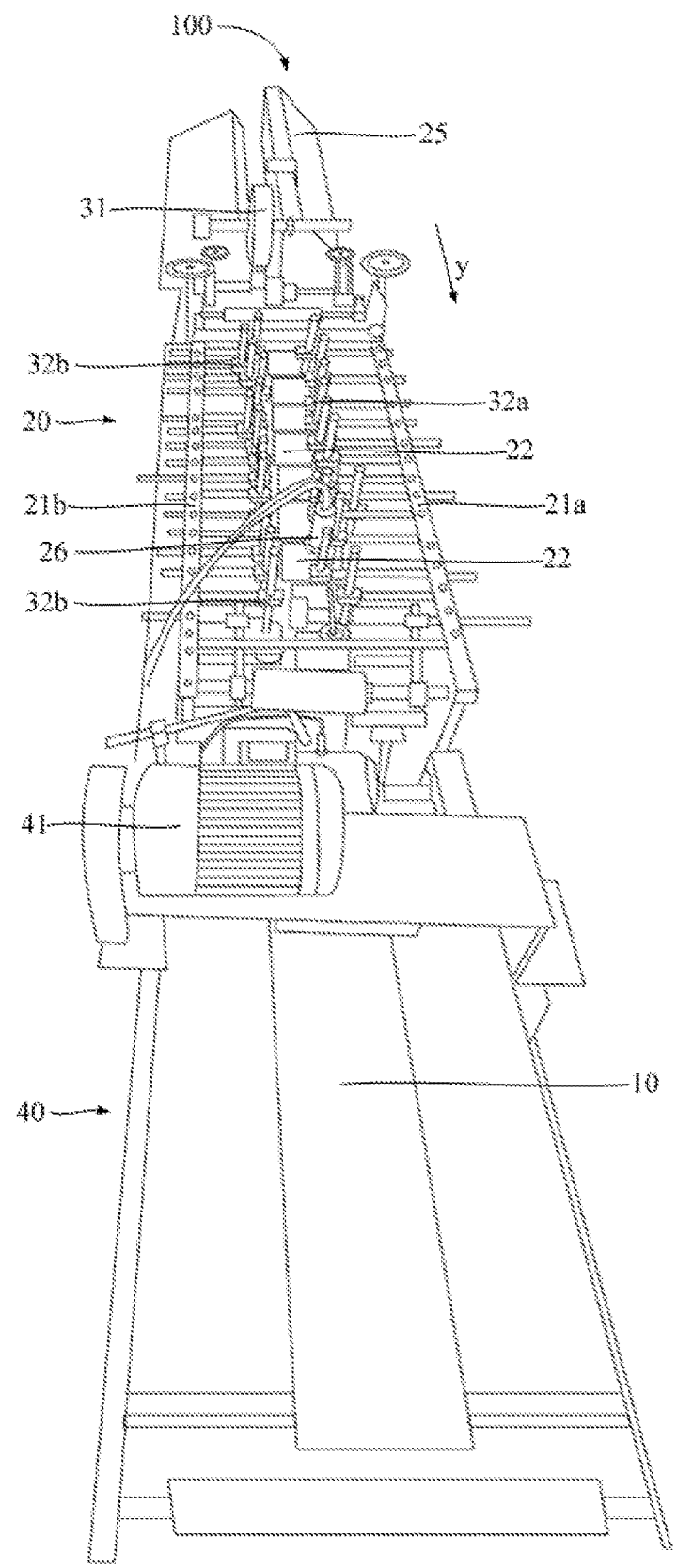
FIG. 5 schematically illustrates a stereogram of an apparatus 100 for coating a solid wood floor according to an embodiment of the present disclosure.
Figure 6:
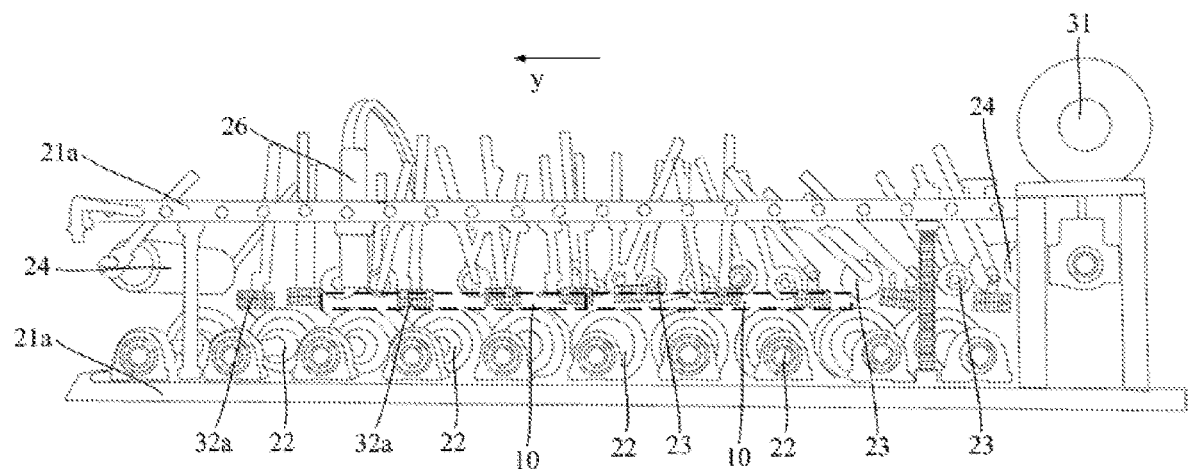
FIG. 6 schematically illustrates a structural diagram of a conveying device 20 and a film coating device shown in FIG. 5.

Referring to FIG. 5 and FIG. 6, an apparatus for coating a solid wood floor film 100 is provided according to embodiments, which includes a conveying device 20 and a film coating device. The conveying device 20 includes at least one slide rail and a conveying member disposed on the at least one slide rail, where the conveying member is configured to carry a solid wood floor and to convey the solid wood floor along an extending direction of the at least one slide rail.

Specifically, the at least one slide rail may include a first slide rail 21a and a second slide rail 21b arranged in parallel, the conveying member may include at least one first roller 22 rotatably disposed on the first slide rail 21a and the second slide rail 21b, and there may be a plurality of the first rollers 22 disposed in sequence along a slide rail direction y. The solid wood floor 10 is configured to be disposed on the plurality of first rollers 22 and can be driven to move in the slide rail direction y by rotation of the plurality of first rollers 22.

The film coating device may include a film rolling part 31 and at least one pressing wheel, where the film rolling part 31 is fixedly disposed on the conveying device 20 and configured to receive the polyethylene protective film 11. The at least one pressing wheel is rotatably disposed on the at least one slide rail, is disposed opposite to at least one side surface of the solid wood floor 10 and is configured to press the polyethylene protective film 11 toward the at least one side surface, where the at least one side surface defines a boundary of a width dimension of the solid wood floor 10.

Specifically, the film rolling part 31 is fixedly disposed at one axial end of the first slide rail 21a and the second slide rail 21b. The at least one pressing wheel may include at least one first pressing wheel 32a and at least one second pressing wheel 32b, where the at least one first pressing wheel 32a may be rotatably disposed on the first slide rail 21a and is configured to be disposed opposite to the first side surface 10a of the solid wood floor 10; and the at least one second pressing wheel 32b may be rotatably disposed on the second slide rail 21b and is configured to be disposed opposite to the second side surface face 10b of the solid wood floor 10.

Therefore, when the solid wood floor 10 is placed on the plurality of first rollers 22, the plurality of first rollers 22 can drive the solid wood floor 10 to move in the slide rail direction y. Simultaneously, a part of the polyethylene protective film 11 is disposed between the at least one first pressing wheel 32a and the first side surface 10a, and the at least one first pressing wheel 32a can press the polyethylene protective film 11 against the first side surface 10a and adhere the polyethylene protective film 11 to the first side surface 10a. The at least one second pressing wheel 32b can apply a force to the second side surface 10b to balance the force from the at least one first pressing wheel 32a and to prevent a position of the solid wood floor from shifting.

When the solid wood floor 10 moves along the slide rail direction y, the at least one first pressing wheel 32a and the at least one second pressing wheel 32b may rotate following the movement of the solid wood floor 10, and thus no sliding friction will be generated between the at least one first pressing wheel 32a and the solid wood floor 10 or between the at least one second pressing wheel 32b and the solid wood floor 10. Therefore, the movement of the solid wood floor 10 in the slide rail direction y will not be hindered to a large extent.

As the solid wood floor 10 moves along the slide rail direction y, the polyethylene protective film 11 is adhered from one end of the solid wood floor 10 to the other end in the length direction so as to complete coating of the first side surface 10a. The film rolling part 31 provides the polyethylene protective film 11 for the solid wood floor 10.

The pores on the solid wood floor can be sealed by adhering the polyethylene protective film 11 to the first side surface 10a of the solid wood floor 10. Therefore, external moisture can be prevented from entering an interior of the solid wood floor 10, the solid wood floor 10 can be prevented from being deformed by moisture, and a service life of the solid wood floor 10 and customer satisfaction can be improved.

Further, if the second side surface 10b of the solid wood floor 10 needs to be coated, a portion of the polyethylene protective film 11 may be disposed between the at least one second pressing wheel 32b and the second side surface 10b. The at least one second pressing wheel 32b is configured to press the polyethylene protective film 11 against the second side surface 10b and to adhere the polyethylene protective film 11 to the second side surface 10b.

It should be noted that, in some embodiment, the apparatus 100 for coating a solid wood floor can coat a plurality of solid wood floors 10 simultaneously. As shown in FIG. 6, the plurality of solid wood floors 10 may be connected end to end in the length direction. The polyethylene protective film 11 is continuously adhered to the first side surface 10a or the second side surface face 10b of each of the plurality of solid wood floors 10 using the at least one first pressing wheel 32a or the at least one second pressing wheel 32b.

In other embodiments, the conveying member may also be a conveyor belt configured to carry a solid wood floor, where the conveyor belt may be moved along the slide rail direction y so as to drive the solid wood floor 10 to move along the slide rail direction y as well.

With continued reference to FIG. 5 and FIG. 6, there may be a plurality of the first pressing wheels 32a sequentially disposed along the slide rail direction y, and a plurality of the second pressing wheels 32b sequentially disposed along the slide rail direction y.

With the plurality of first pressing wheels 32a and the plurality of second pressing wheels 32b, the solid wood floor 10 can be subjected to forces at a plurality of positions in its length direction (i.e., the slide rail direction y), thereby ensuring that the polyethylene protective film 11 can be always adhered to the first side surface 10a or the second side surface 10b.

In some embodiment, the conveying device 20 may further include at least one second roller 23 rotatably disposed on the at least one slide rail. Specifically, the at least one second roller 23 may be disposed on the first slide rail 21a or the second slide rail 21b, and the at least one second roller 23 may be disposed opposite to the at least one first roller 22 and may be configured to press against the solid wood floor 10.

When the solid wood floor 10 is placed on the at least one first roller 22, the solid wood floor 10 moves in the slide rail direction y along with the rolling of the at least one first roller 22. The at least one second roller 23 is configured to press the solid wood floor 10, and to limit the solid wood floor 10 between the at least one first roller 22 and the at least one second roller 23, so as to prevent the solid wood floor 10 from jumping in a direction perpendicular to the slide rail direction y, and to make the solid wood floor 10 move more smoothly along the slide rail direction y.

When the solid wood floor 10 moves in the slide rail direction y, the at least one second roller 23 in contact with the solid wood floor 10 can rotate with the movement of the solid wood floor 10 and thus no sliding friction will generate between the at least one second roller 23 and a surface of the solid wood floor 10. Therefore, the movement of the solid wood floor 10 in the slide rail direction y will not be hindered to a large extent. Specifically, there may be a plurality of the second rollers 23 arranged in sequence along the slide rail direction y.

Referring to FIG. 6, in some embodiment, the conveying device 20 may further include a press roll 24 having a cylindrical shape with a central axis perpendicular to the slide direction y. There may be two of the press rolls 24 which are respectively disposed at two axial ends of the first slide rail 21a and the second slide rail 21b, and the two press rolls 24 are configured to: press the solid wood floor 10 so that the solid wood floor 10 can smoothly enter or leave the coating area.

In some embodiment, a distance between the first slide rail 21a and the second slide rail 21b is adjustable.

Therefore, by adjusting the distance between the first slide rail 21a and the second slide rail 21b, the conveying device 20 can be adapted to the solid wood floors 10 with different widths, so that the apparatus for coating a solid wood floor film 100 can be applied more widely.

Specifically, the conveying device 20 may be provided with a slide rod perpendicular to the first slide rail 21a and the second slide rail 21b. At least one of the first slide rail 21a and the second slide rail 21b is provided with a slider, where the slider engages the slide rod and is configured to move along the slide rod so as to adjust the distance between the first slide rail 21a and the second slide rail 21b.

With continued reference to FIG. 5, the conveying device 20 may further include a feeding part 25. The feeding part 25 is fixedly disposed at one axial end of the first slide rail 21a and the second slide rail 21b, and a plurality of solid wood floors 10 can be placed in the feeding part 25. When the apparatus for coating a solid wood floor 100 is in operation, the plurality of solid wood floors 10 in the feeding part 25 can be continuously carried away by the at least one first roller 23 and be coated. It is not necessary for workers to keep adding solid wood floors, thereby reducing labor costs.

In some embodiment, the conveying device 20 may further include a code-spurting machine 26, where the code-spurting device 26 is fixedly disposed on the first slide 21a or the second slide 21b and is configured to spurt code on the solid wood floor 10 to make identification on the solid wood floors of different batches.

Figure 7:
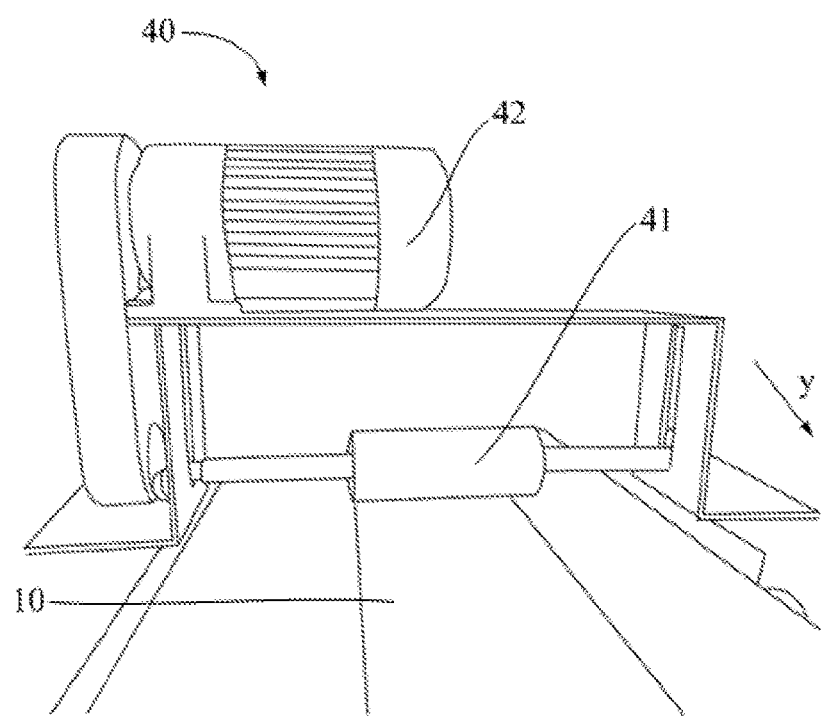
FIG. 7 schematically illustrates a structural diagram of a tearing device 40 shown in FIG. 5.

Referring to FIGS. 5 and 7, in some embodiment, the apparatus for coating a solid wood floor 100 may further include a tearing device 40 connected with the conveying device 20, where the tearing device 40 is fixedly disposed on the other axial end of the first slide rail 21a and the second slide rail 21b and is configured to receive the coated solid wood floor.

Specifically, the tearing device 40 may include a first guide roller 41 and a second guide roller (not shown), where the first guide roller 41 is configured to fit a front of the solid wood floor 10, and the second guide roller is configured to fit a back of the solid wood floor 10.

When the solid wood floor 10 is coated and enters an area where the tearing device 40 is located, the first guide roller 41 and the second guide roller are configured to drive the solid wood floor 10 to move along an extending direction of the at least one slide rail by rotation. A moving speed of the solid wood floor 10 driven by the first guide roller 41 and the second guide roller is greater than a moving speed of the solid wood floor 10 in the conveying device 20. Therefore, two adjacent solid wood floors 10 can be separated. That is, the polyethylene protective film 11 continuously adhered to two adjacent solid wood floors can be torn off.

In some embodiment, the tearing device 40 may further include a driving motor 42, where the driving motor 42 is connected with the first guide roller 41 and the second guide roller to drive the first guide roller 41 and the second guide roller to rotate.

In other embodiments, one of the first guide roller 41 and the second guide roller may be provided to drive the solid wood floor 10 to move along the slide rail direction y.

In some embodiment, the apparatus 100 for coating a solid wood floor may work in a manner as below.

A distance between the first slide rail 21a and the second slide rail 21b is adjusted according to a specific width of the solid wood floor 10, so that the solid wood floor 10 is configure to be placed in an area between the first pressing wheel 32a and the second pressing wheel 32b, and meanwhile the at least one first pressing wheel 32a fits the first side surface 10a and the at least one second pressing wheel 32a fits the second side surface 10b.

A plurality of the solid wood floors 10 may be placed in the feeding part 25. One or more solid wood floors 10 may be placed on the at least one first roller 22, and the polyethylene protective film 11 may be disposed between the at least one first pressing wheel 32a and the first side surface 10a of the solid wood floor 10.

The apparatus 100 for coating a solid wood floor is started. The at least one first roller 22 rolls, the solid wood floor 10 disposed on the at least one first roller 22 moves in the slide rail direction y, and the polyethylene protective film 11 is gradually adhered to the first side surface 10a. A moving speed of the solid wood floor 10 may range from 0.5 m/s to 0.7 m/s. If the solid wood floor 10 moves too slow, coating efficiency and production benefit may be reduced; if the solid wood floor 10 moves too fast, the polyethylene protective film 11 will be tore off.

During a process of transporting the solid wood floor 10 by the at least one first roller 22, the solid wood floors 10 in the feeding part 25 fall on the alt least one first roller 22 one by one and move along the slide rail direction y, so as to achieve continuously coating a plurality of solid wood floors at the same time. That is, the polyethylene protective film 11 can be continuously adhered to the plurality of solid wood floors 10.

On the other hand, the at least one second roller 23 fixedly disposed on the first slide rail 21a or the second slide rail 21b limits the solid wood floor 10 between the at least one first roller 22 and the at least one second roller 23 to prevent the solid wood floor 10 from jumping. Therefore, the solid wood floor 10 can move along the slide rail direction y more smoothly.

When the solid wood floor 10 is coated and enters the tearing device 40, the driving motor 42 drives the first guide roller 41 and the second guide roller to rotate, and the first guide roller 41 and the second guide roller drive the solid wood floor 10 to move along the slide rail direction y by rotating. In some embodiment, a moving speed of the solid wood floor 10 may range from 1.0 m/s to 1.5 m/s.

A moving speed of the solid wood floor 10 in the tearing device 40 is greater than a moving speed of the solid wood floor 10 in the conveying device 20, so that the solid wood floor 10 is accelerated when entering the tearing device 40, and speeds of two adjacent solid wood floors 10 are inconsistent, which may result in that the polyethylene protective film 11 continuously adhered to two adjacent solid wood floors is torn apart.

When the polyethylene protective film 11 is torn off, the excess polyethylene protective film 11 protrudes beyond the first end and the second end of the first side surface 10a in the length direction, which affects an overall appearance of the solid wood floor 10. Then, the first end and the second end may be blown with a hot air gun, and a temperature of hot air of the hot air gun may range from 400° C. to 600° C. so as to quickly melt the polyethylene protective film 11 and further to enhance the overall appearance of the solid wood floor 10.

Although the present disclosure has been described above, the present disclosure is not limited thereto. It should be understood by those skilled in the art that various changes and modifications may be made without departing from the spirit and scope of the disclosure, and therefore, the scope of the disclosure should be limited by the scope of the claims.

The invention claimed is:

1. An apparatus for coating a solid wood floor, comprising:
   a conveying device, comprising at least one slide rail and a conveying member disposed on the at least one slide rail, wherein the conveying member is configured to carry a solid wood floor and to convey the solid wood floor along an extending direction of the at least one slide rail;
   a film coating device, comprising a film rolling part and at least one pressing wheel, wherein the film rolling part is fixedly disposed on the conveying device and a polyethylene protective film is rolled on the film rolling part; the at least one pressing wheel is rotatably disposed on the at least one slide rail and is disposed opposite to at least one side surface of the solid wood floor and is configured to press the polyethylene protective film toward the at least one side surface so as to adhere the polyethylene protective film to the at least one side surface from one end to the other end of the at least one side surface in a length direction of the solid wood floor, wherein the at least one side surface of the solid wood floor defines at least one boundary of a width dimension of the solid wood floor; and
   a heated air gun for melting excess polyethylene protective film beyond a first end and a second end of the at least one side surface in the length direction;
   wherein the conveying device further comprises two press rolls respectively disposed at two axial ends of the at least one slide rail and configured to press the solid wood floor so that the solid wood floor can smoothly enter or leave a coating area.

2. The apparatus for coating a solid wood floor according to claim 1, wherein the conveying member comprises a plurality of first rollers disposed in sequence along the extending direction of the at least one slide rail, and the plurality of first rollers are configured to convey the solid wood floor by rotating.

3. The apparatus for coating a solid wood floor according to claim 1, wherein the conveying device further comprises at least one second roller rotatably disposed on the at least one slide rail, the at least one second roller is disposed opposite to the conveying member along a direction perpendicular to the at least one slide rail and is configured to press against the solid wood floor.

4. The apparatus for coating a solid wood floor according to claim 1, wherein the at least one slide rail comprises a first slide rail and a second slide rail arranged in parallel;
   the at least one pressing wheel comprises at least one first pressing wheel rotatably disposed on the first slide rail, and at least one second pressing wheel rotatably disposed on the second slide rail; and
   the at least one first pressing wheel and the at least one second pressing wheel are disposed opposite to two side surfaces of the solid wood floor respectively.

5. The apparatus for coating a solid wood floor according to claim 4, wherein a plurality of the first pressing wheels are disposed in sequence along an extending direction of the first slide rail, and a plurality of the second pressing wheels are disposed in sequence along an extending direction of the second slide rail.

6. The apparatus for coating a solid wood floor according to claim 4, wherein a distance between the first slide rail and the second slide rail is adjustable.

7. The apparatus for coating a solid wood floor according to claim 1, further comprising: a tearing device connected with the conveying device and configured to receive the solid wood floor after being coated;
   wherein the tearing device comprises at least one fixed guide roller, the at least one guide roller is configured to fit the solid wood floor and to drive the solid wood floor to move along the extending direction of the at least one slide rail by rotation.

8. The apparatus for coating a solid wood floor according to claim 7, wherein the at least one guide roller comprises a first guide roller and a second guide roller, the first guide roller is configured to fit a front of the solid wood floor, and the second guide roller is configured to fit a back of the solid wood floor.

9. The apparatus for coating a solid wood floor according to claim 7, wherein the tearing device further comprises a driving motor, and the driving motor is connected with the at least one guide roller to drive the at least one guide roller to rotate.

10. The apparatus for coating a solid wood floor according to claim 8, wherein a moving speed of the solid wood floor driven by the first guide roller and the second guide roller is greater than a moving speed of the solid wood floor in the conveying device.

11. A method for coating the solid wood floor using the apparatus according to claim 1, comprising:
   providing the solid wood floor, wherein the at least one side surface of the solid wood floor has two side surfaces defining boundaries of the width dimension of the solid wood floor; and
   the film rolling part providing the polyethylene protective film, and the at least one pressing wheel adhering the polyethylene protective film to at least one of the two side surfaces.

12. The method for coating the solid wood floor according to claim 11, wherein the polyethylene protective film is adhered to the at least one side surface from one end to the other end of the at least one side surface along the length direction of the solid wood floor by the at least one pressing wheel.

13. The method for coating the solid wood floor according to claim 12, wherein the polyethylene protective film is adhered to the at least one side surface by the at least one pressing wheel at a speed ranging from 0.5 m/s to 0.7 m/s.

14. The method for coating the solid wood floor according to claim 12, further comprising: heating both ends of the at least one side surface after adhering the polyethylene protective film to the at least one side surface by the at least one pressing wheel, wherein the heating temperature ranges from 400° C. to 600° C.

15. The method for coating the solid wood floor according to claim 12, further comprising forming a paint film on the at least one side surface before adhering the polyethylene protective film to the at least one side surface by the at least one pressing wheel.

16. The method for coating the solid wood floor according to claim 11, wherein the polyethylene protective film has a thickness ranging from 0.05 mm to 0.20 mm.

17. The method for coating the solid wood floor according to claim 11, wherein the two side surfaces of the solid wood floor comprise a first side surface having a tongue structure and a second side surface having a groove structure, and the polyethylene protective film is adhered to the first side surface by the at least one pressing wheel.

* * * * *